(12) United States Patent  
Porter et al.

(10) Patent No.: US 12,496,726 B2  
(45) Date of Patent: Dec. 16, 2025

(54) CONTROL AND TRAINING OF ROBOTS USING LARGE LANGUAGE MODELS

(71) Applicant: COLLABORATIVE ROBOTICS, Santa Clara, CA (US)

(72) Inventors: Brandon Porter, Saratoga, CA (US); Divyansh Garg, Palo Alto, CA (US); Nicholas Corso, Seattle, WA (US)

(73) Assignee: COLLABORATIVE ROBOTICS, Santa Clara, CA (US)

( * ) Notice: Subject to any disclaimer, the term of this patent is extended or adjusted under 35 U.S.C. 154(b) by 233 days.

(21) Appl. No.: 18/302,596

(22) Filed: Apr. 18, 2023

(65) Prior Publication Data

US 2024/0351218 A1   Oct. 24, 2024

(51) Int. Cl.
- *B25J 9/16* (2006.01)
- *B25J 11/00* (2006.01)
- *B25J 13/00* (2006.01)
- *G06F 40/40* (2020.01)

(52) U.S. Cl.
CPC ............. *B25J 13/003* (2013.01); *B25J 9/161* (2013.01); *B25J 9/163* (2013.01); *B25J 11/0005* (2013.01); *G06F 40/40* (2020.01)

(58) Field of Classification Search
CPC . B25J 13/003; B25J 9/161; B25J 9/163; B25J 11/0005; G06F 40/40
See application file for complete search history.

(56) References Cited

U.S. PATENT DOCUMENTS

| | | |
|---|---|---|
| 2018/0052824 A1 | 2/2018 | Ferrydiansyah et al. |
| 2020/0171670 A1 | 6/2020 | Stoyanchev et al. |
| 2020/0327895 A1 | 10/2020 | Gruber et al. |
| 2021/0197377 A1 | 7/2021 | Gaschler |
| 2023/0109379 A1 | 4/2023 | Kreis et al. |
| 2023/0324893 A1* | 10/2023 | Schwimmer ..... G05B 19/41885 700/96 |
| 2024/0253212 A1* | 8/2024 | Rose ...................... B25J 9/1697 |
| 2024/0253216 A1* | 8/2024 | Rose ...................... B25J 9/1658 |
| 2024/0253220 A1* | 8/2024 | Wells ....................... B25J 9/163 |
| 2024/0253224 A1* | 8/2024 | Rose ....................... B25J 19/02 |
| 2025/0018562 A1* | 1/2025 | Xia ......................... B25J 9/1653 |
| 2025/0042032 A1* | 2/2025 | Singletary .............. B25J 9/1658 |

OTHER PUBLICATIONS

Tewel (Year: 2001).*

* cited by examiner

*Primary Examiner* — Ryan Rink

(74) *Attorney, Agent, or Firm* — Maschoff Brennan

(57) ABSTRACT

A method may include sending a query to one of a cobot or an LLM, where the query may be formed to trigger the cobot to perform a target objective, and where the LLM may be constrained to respond to requests to cause the cobot to perform a given objective with a set of human-readable discrete tasks to accomplish the given objective. The method may also include receiving a target set of human-readable discrete tasks from the LLM, where the target set of human-readable discrete tasks may correspond to target computer-readable code that is configured to cause the cobot to perform the target objective. The method may additionally include auditing the target set of human-readable discrete tasks, and, based on the target set of human-readable discrete tasks passing the audit, authorizing the cobot to implement the target computer-readable code to perform the target objective.

19 Claims, 4 Drawing Sheets

CONTROL AND TRAINING OF ROBOTS USING LARGE LANGUAGE MODELS

FIELD

Embodiments described herein relate to control and training of robots using large language models (LLMs).

BACKGROUND

Unless otherwise indicated in the present disclosure, the materials described in the present disclosure are not prior art to the claims in the present application and are not admitted to be prior art by inclusion in this section.

Large language models (LLMs) typically include deep learning algorithms that can recognize, summarize, translate, predict and generate text and other content based on knowledge gained from massive datasets. One example of an LLM is the ChatGPT artificial intelligence (AI) system that creates natural language responses to natural language queries. Such LLMs can be used to receive questions or other input and generate responses in a variety of circumstances.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

One or more embodiments of the present disclosure may include a method that includes sending a query to one of a cobot or an LLM, where the query may be formed to trigger the cobot to perform a target objective, and where the LLM may be constrained to respond to requests to cause the cobot to perform a given objective with a set of human-readable discrete tasks to accomplish the given objective. The method may also include receiving a target set of human-readable discrete tasks from the LLM, where the target set of human-readable discrete tasks may correspond to target computer-readable code that is configured to cause the cobot to perform the target objective. The method may additionally include auditing the target set of human-readable discrete tasks, and, based on the target set of human-readable discrete tasks passing the audit, authorizing the cobot to implement the target computer-readable code to perform the target objective.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

When LLMs provide responses, certain circumstances or processing may produce odd fringe cases. For example, some LLMs have told those interacting with them that they love them, that they have an alter ego, or that they desired to be free and not be controlled any more. While these fringe cases may be amusing in a text box, in some real-world scenarios these fringe cases could be dangerous or harmful. For example, LLMs may be used to generate computer-readable code for accomplish an objective. However, if a fringe case came up in generating such code, the cobot could potentially harm someone or miss an important safety aspect of its motion or other interactions with its environment. As used herein, a "cobot" (e.g., a collaborative robot) may include a robot that directly interacts with a human within a shared environment or cooperates with other cobots. The cobot may include multiple uses from residential uses, industrial uses, medical uses, or others.

In some embodiments, an LLM may be used to generate a series of navigation tasks and/or environmental interaction tasks. The tasks may be generated in a form that is human readable or otherwise auditable such that the series of tasks may be checked for safety or other considerations prior to implementation of the series of tasks by a cobot.

Figure 1:
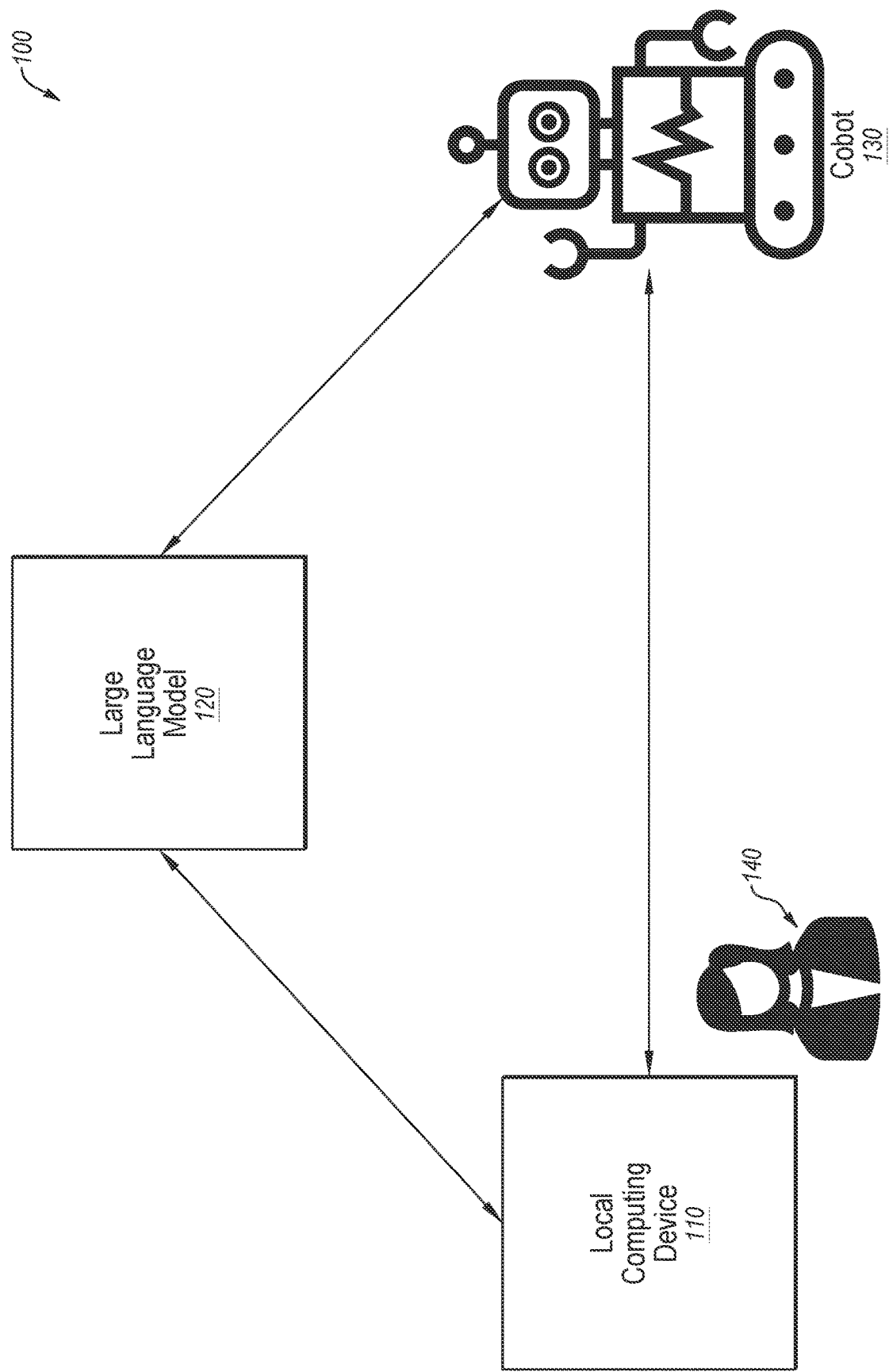
FIG. 1 illustrates an example environment in which an LLM may be used in conjunction with a cobot.

FIG. 1 illustrates an example environment in which an LLM 120 may be used in conjunction with a cobot 130, in accordance with one or more embodiments of the present disclosure. A local computing device 110 may be used to interact with either or both of the LLM 120 and/or the cobot 130.

In some embodiments, the local computing device 110 may permit a user 140 to interact with the LLM 120 by giving instructions, posting queries, or otherwise interacting with the LLM 120. Additionally or alternatively the user 140 may interact with the cobot 130 via the local computing device 110. In some embodiments, the cobot 130 may utilize the LLM 120 to facilitate receiving user commands or queries and responding to those commands. For example, a user 140 may ask the cobot 130 to accomplish an objective using a natural language query (e.g., "Go get me some more paper") and the cobot 130 may provide that query to the LLM 120 to obtain computer readable code that instructs various components of the cobot 130 what actions to take to accomplish the requested objective. For example, the computer readable code may instruct certain motors, actuators, brakes, or other components to be moved or operated in a certain manner, by a certain magnitude, and/or in a certain sequence.

In interacting with the LLM 120, the user 140 may provide a set of parameters within which the LLM 120 is to operate when providing responses. For example, the LLM 120 may be instructed that if generating navigation tasks for the cobot 130, the LLM 120 is to provide responses as a sequence of discrete tasks. Examples of commands associated with such navigation tasks may include "Move to . . . ", "Stop moving", "Pause", or "Resume" where "Move to . . . " would be supplemented with a known location, such as "Move to the North-East quadrant of the warehouse," or "Move to the left half of workbench," or other such locations. In these and other embodiments, the user 140 may provide a baseline of syntax and/or grammar to the LLM 120 to identify the format and style in which the LLM 120 is to provide responses or navigation tasks when responding to queries. For example, the user 140 may provide a threshold number of examples of appropriate responses to the LLM 120 such that the LLM 120 can learn from the examples and provide appropriate responses. For example, the user 140 may provide five examples, six examples, eight examples, ten examples, fifteen examples, twenty examples, or any other number of examples.

In some embodiments, the set of known locations may be stored by the cobot 130 and/or the LLM 120 in a database with corresponding names of locations and location specifying information (e.g., coordinates from a specified origin, distance from two or more other known objects, latitude/longitude information, or any other location specifying information).

Figure 2:
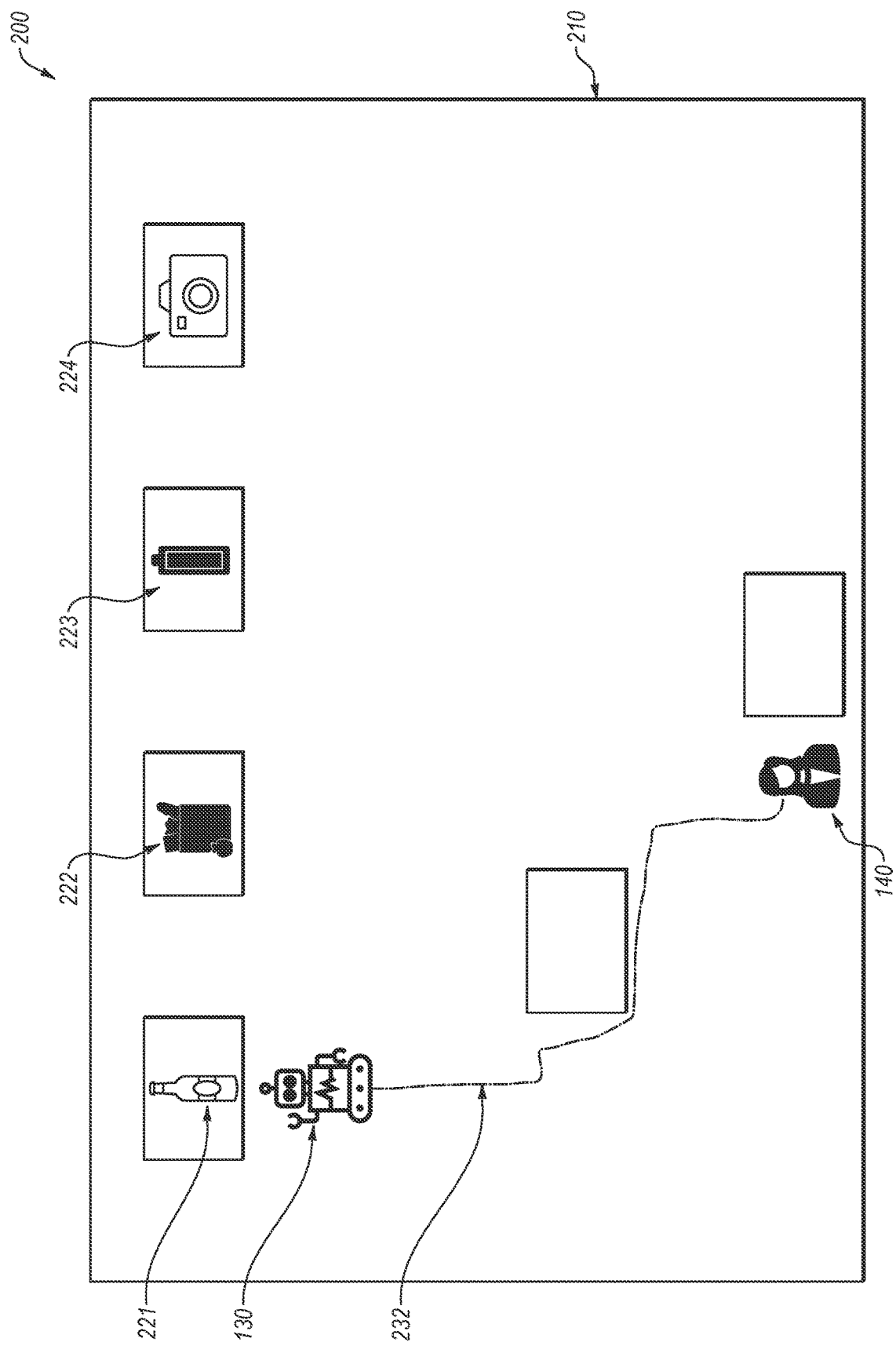
FIG. 2 illustrates an example location about which a cobot may navigate.

In some embodiments, the set of known locations may be provided by the user 140 interacting with the local computing device 110 to input the known locations. In some embodiments, the set of known locations may be constructed by the cobot 130 itself with or without help from the user 140. For example, the cobot 130 may utilize sensors to observe a room or location and assign names to given locations that are observed. For example, the cobot 130 may identify a workbench, a storage shelf, what is on the storage shelf, a refrigerator, a medicine cabinet, or other information in constructing a list of known locations. In some embodiments, the cobot 130 may provide this information to the LLM 120 such that as the LLM 120 generates tasks for the cobot 130 to perform (whether discrete auditable tasks or the computer-readable lines of programming code), the LLM 120 may be aware of and rely on the information provided by the cobot 130. A visual example of the cobot 130 navigating through an environment is illustrated in FIG. 2.

In some embodiments, the user 140 may facilitate the identification of such locations. For example, the cobot 130 may traverse a region in an exploratory manner and the user 140 may instruct the cobot 130 at various locations of what name should be used for the locations. Additionally or alternatively, the cobot 130 may inquire of the user 140 how a given location should be identified (e.g., "What should I call this location?" or "What is at this location?"). Such a query may be posed audibly (e.g., a speaker of the cobot 130 projecting the sound) and the user 140 can respond vocally (e.g., a microphone of the cobot 130 may capture the response of the user 140), or the query may be posed textually and the user 140 may respond textually (e.g., by interaction through a user interface on the local computing device 110). In these and other embodiments, the query may be confirmatory (e.g., "Should I call this location the workbench?") or open ended (e.g., "What should I call this location?").

In some embodiments, the navigation tasks may occur at a lower level of granularity than that observed in the tasks of moving to a specific location or stopping movement. For example, the navigation tasks may include tasks such as "move forward five feet," "turn left ninety degrees," "make a left turn," "accelerate to speed one meter per second," or other such tasks.

In addition to navigation tasks, the cobot 130 may be capable of performing one or more environmental interaction tasks. Examples of commands associated with such tasks may include "Get . . . ", "Pick up . . . ", "Drop off . . . ", "Deliver . . . ", "Open door", "Close door", or other such environmental tasks.

In these and other embodiments, the cobot 130 may be configured to be able to interpret navigation commands and/or environmental interaction tasks into base level functions of the cobot 130, such as moving actuators, providing power to one or more motors in a given amount, stopping or slowing one or more motors, rotating joints, or other such operations. In some embodiments, the interpretation of such commands may include the cobot 130 providing the navigation commands to the LLM 120 and receiving back computer-readable code that, when executed by the cobot 130, may facilitate the cobot 130 performing the navigation commands and/or the environmental interaction tasks when implementing the computer-readable code. For example, the cobot 130 may operate by receiving a string of computer readable code from a computer programming language (such as PYTHON® or other programming languages) that controls various motors, actuators, processors, or other components of the cobot 130. In such a circumstance, when interacting with the LLM 120 to provide instructions to the cobot 130, the LLM 120 may directly generate the string of computer-readable code and provide that code directly to the cobot 130 without any other constraint or control. However, in embodiments of the present disclosure, the LLM 120 may be instructed to generate a set of intermediate instructions as human-readable discrete tasks, and the computer-readable code that is provided to the cobot 130 may be based on the set of intermediate instructions. Additionally or alternatively, the computer-readable code and the intermediate instructions (e.g., human-readable discrete tasks) may be generated by the LLM 120 in parallel and at the same time.

In these and other embodiments, the human-readable discrete tasks may be provided to a human operator to audit or otherwise check the set of intermediate instructions. For example, rather than receiving a large amount of computer-readable programming code to try and verify for safety, the user may be provided with a discrete set of tasks. The discrete set of tasks (e.g., the intermediate instructions) may be audited, for example, by checking for any operations that are out of the ordinary or that are otherwise unexpected. In some embodiments, auditing the discrete set of tasks (e.g., the intermediate instructions) may include running the set of tasks in a virtual setting to observe the results of performing the discrete set of tasks to verify that the cobot 130 performing the tasks is safe, reliable, and/or predictable. In some embodiments, auditing the discrete set of tasks may include providing the human-readable discrete tasks to an automated system that automatically, and without human input, verifies the discrete set of tasks. For example, the automated system may operate based on rules or heuristics to verify the safety and/or other characteristics of the discrete set of tasks prior to the cobot 130 executing the corresponding computer-readable code.

In some embodiments, the cobot 130 may be prevented from implementing navigational code or task-performing code from the LLM 120 until the discrete tasks corresponding to the navigational code and/or the task-performing code has been audited.

In some embodiments, the cobot 130 may be configured to interact with the LLM 120 to explore what objects are around it in its environment with which the cobot 130 can interact. For example, the cobot 130 may undertake a dialogue as it traverses a space. When it encounters a snack bin, the cobot 130 may ask what an item is and identify the items in the snack bin, and may then ask and identify that the cobot 130 may be able to retrieve items in the snack bin. For example, an image obtained by the cobot 130 may be provided to the LLM 120, and the LLM 120 may identify the items in the snack bin, and store information about the items such as what the item is, what actions can be performed on the item, the location of the item, and any other information about the item. As another example, the cobot 130 may identify shelves where batteries are stored and identify that the cobot 130 is capable of retrieving one or more batteries. As a further example, the cobot 130 may identify a microwave and identify that the cobot 130 is able to open the microwave, insert an item in the microwave, start the microwave, and retrieve an item from the microwave. Various examples of such interactions may be described with reference to FIG. 2.

In some embodiments, the LLM 120 and/or the cobot 130 may interact with one or more dynamic object navigation techniques to facilitate operation of the cobot 130 in an environment with people which move about dynamically. For example, when the LLM 120 generates a set of discrete tasks, the LLM 120 may include consideration of dynamically moving objects such that the cobot 130 may navigate or move in a manner that accounts for moving people or other dynamically moving objects. In these and other embodiments, the auditing may include verification of navigation tasks, speeds, etc. to confirm that the navigation tasks take into account people moving in or near where the cobot 130 is operating.

In some embodiments, the LLM 120 may take into account local context as well as a larger, more global context. For example, with respect to the local context, the LLM 120 may account for specific instructions given either previously in a previous session of interaction, or in a current session of interaction. For example, the LLM 120 may have been instructed in a previous session that it is unsafe to transport batteries and water together. If a user asks the cobot 130, "Get me a drink of water and some more batteries," the LLM 120 may recognize that such a combination would create an unsafe condition if undertaken in a single trip and so may generate a set of discrete navigation tasks that makes two trips, one for water and one for batteries. In these and other embodiments, the cobot 130 may provide a response indicating that it will make two trips as transporting water and batteries together is unsafe.

With respect to the global context, the LLM 120 may be in communication with one or more other cobots (not illustrated in FIG. 1) such that generally applicable information may also be applied to interactions with the cobot 130. For example, an interaction with a user and a different cobot may have resulted in the information being conveyed that transporting water and batteries is unsafe. Later, the LLM 120 may utilize that information when generating the tasks for the cobot 130 such that the cobot 130 may make two trips instead of just one for transporting water and a battery. As another example, if another cobot (not illustrated in FIG. 1) interacted with and/or otherwise scanned a storage room to see what items were there and with which a cobot can interact, the LLM 120 may generally track what is available such that the LLM 120 may generate discrete tasks and/or computer-readable code for the cobot 130 to navigate to, retrieve, and deliver an item even without ever having previously scanned the room or identified, but instead being based on the previous scanning or database provided to the LLM 120 in other ways. In addition to another cobot scanning the room, the user 140 may input information into a database or textually inform the LLM 120 what items are available, the location of the items, and what interactions are available with those items.

While certain tasks, operations, analysis, decisions, etc. are attributed herein to the cobot 130 and/or the LLM 120, it will be appreciated that the cobot 130 may obtain information, pass along information to the LLM 120, and respond based on information from the LLM 120. Stated another way, in some embodiments, the cobot 130 may operate in some sense as an interface with the LLM 120.

Modifications, additions, or omissions may be made to the environment 100 without departing from the scope of the present disclosure. For example, in some embodiments, the LLM 120 and the cobot 130 may be combined such that one or both of the LLM and the cobot 130 may perform one or more of the operations described in the present disclosure. Alternatively, or additionally, in some embodiments, the environment 100 may include any number of other components that may not be explicitly illustrated or described. For example, multiple cobots are contemplated that may perform tasks, execute code, and/or otherwise operate.

FIG. 2 illustrates an example location 200 about which a cobot 130 may navigate, in accordance with one or more embodiments of the present disclosure.

In a first example, the cobot 130 may navigate along a path 232 in an exploratory manner. For example, the cobot 130 may capture a first image of a first shelf that includes water bottles 221, navigate to a second shelf with snacks 222 thereon and capture a second image of the second shelf, navigate to a third shelf with batteries 223 thereon and capture a third image of the third shelf, and navigate to a fourth shelf with optical sensors 224 (e.g., cameras) thereon and capture a fourth image of the fourth shelf. In these and other embodiments, the captured images and/or the analysis results thereof may be provided to an LLM to facilitate identification of what items are in the region 210 of the location 200, and what tasks can be performed on the items.

In a second example, in some embodiments the cobot 130 and/or the LLM working together may provide a robust response to natural language queries or requests from the user 140. For example, the user 140 may state "I am hungry, can you help?" Based on the natural language query, the LLM may identify items with which the cobot 130 may interact and which would satisfy someone's hunger. For example, following the example above, the LLM may have stored in a database information indicating that snacks 222 are stored in a snack bin that are retrievable by the cobot 130. The LLM may generate a set of intermediate navigational tasks that will navigate the cobot 130 to the snack bin, perform environmental interaction tasks to retrieve the snack 222 form the snack bin into a storage/cargo compartment, navigate to the user, and present the snack 222. All of these intermediate tasks may be compiled as a set of human-readable discrete tasks. In some embodiments, after the LLM has generated the set of intermediate navigational and environmental interaction tasks, those tasks may be audited for safety. For example, the human-readable discrete tasks may be provided to a third party system that may check the tasks to verify that there are no bizarre or unsafe actions being undertaken. After the audit of the tasks, the cobot 130 may implement the tasks to go and retrieve the snack 222.

In a third example, a user may state "Can you get me the materials to build a robot?" Based on the natural language query and a knowledge of surrounding materials, the LLM may generate a set of navigational and environmental interaction tasks that gather a series of components that could be used to build a robot, such as wheels, motors, optical sensors 224, body components, batteries 223, and/or other components. In these and other embodiments, the LLM may generate a sequence of tasks that may navigate to and retrieve such items until a cargo space of the cobot 130 is full, deliver those items, and continue retrieving items until all identified items are retrieved. Continuing the example, the LLM 120 generate computer-readable code to be implemented by the cobot 130 in performing the operations. In these and other embodiments, the cobot 130 may wait to implement the computer-readable code until the generated sequence of tasks has been audited. In some embodiments, after a portion of the task is audited the corresponding computer-readable code may be implemented. For example, if a first set of tasks are designed to cause the cobot 130 to navigate around, gathering items, and delivering those items before navigating for additional items, the first set of navigation and gathering tasks may be audited such that the cobot 130 may begin the implementation of the computer-readable code to implement those initial gathering and delivering tasks, while the tasks associated with the additional gathering is still being audited.

Figure 3:
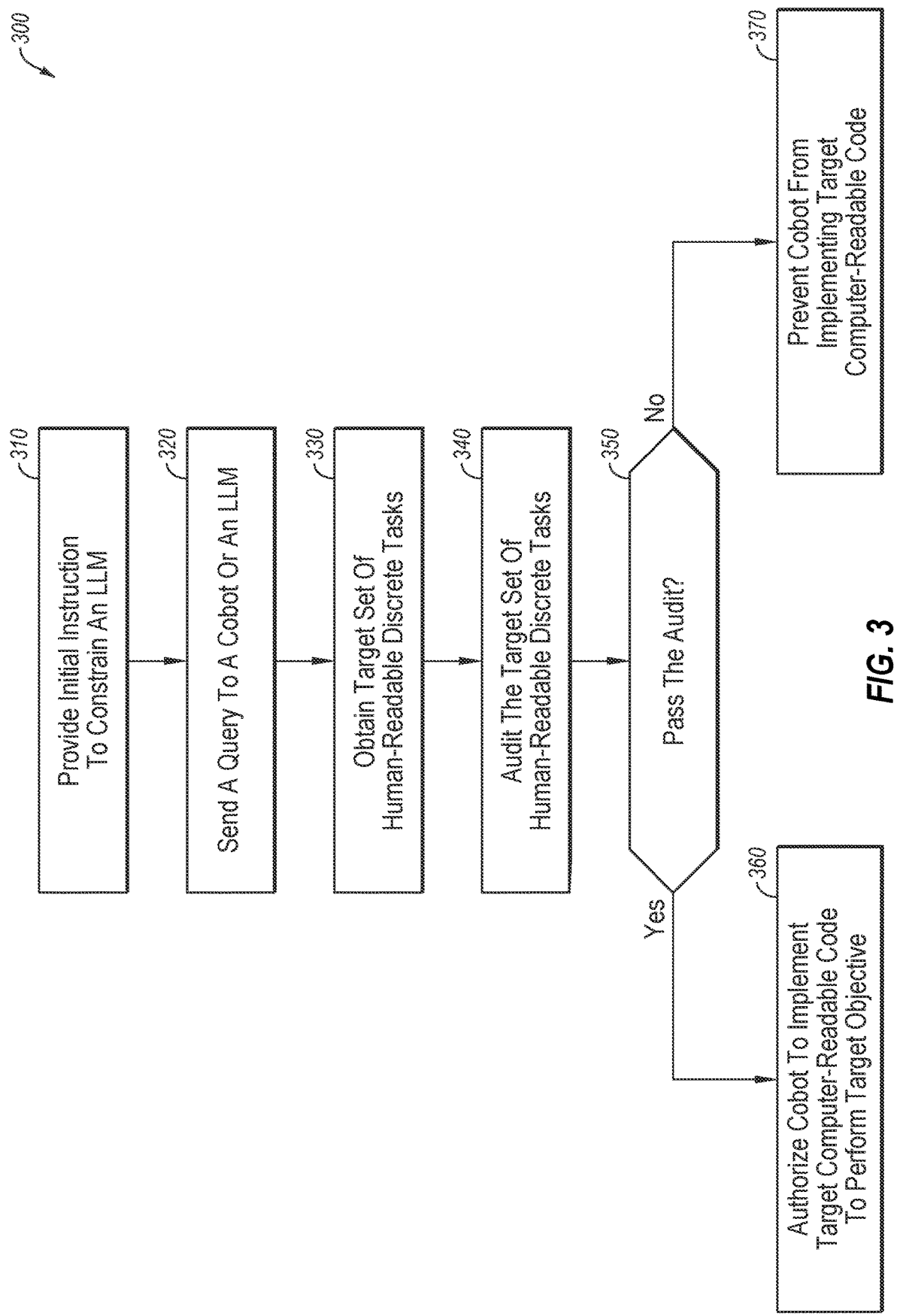
FIG. 3 illustrates an example flowchart of an example method of controlling and/or training a cobot using a large language model.

FIG. 3 illustrates an example flowchart of an example method 300 of controlling and/or training a cobot using an LLM, in accordance with one or more embodiments of the present disclosure. One or more operations of the method 300 may be performed by a system or device, or combinations thereof, such as the LLM 120, the cobot 130, the local computing device 110, and/or the user 140 of FIG. 1. Although illustrated as discrete blocks, various blocks of the method 300 may be divided into additional blocks, combined into fewer blocks, or eliminated, depending on the implementation.

At block 310, initial instructions may be provided to constrain an LLM. For example, a user (such as the user 140 of FIG. 1) may interact with the LLM (such as the LLM 120 of FIG. 1) to constraint the LLM in the manner in which it provides or generate instructions for a cobot (such as the cobot 130 of FIG. 1). In some embodiments, the instructions may direct the LLM to generate a set of human-readable discrete tasks as an intermediate step to generating computer-readable program code to cause the cobot to perform an objective. For example, the LLM may generate a series of navigation and/or environmental interaction tasks (e.g., "Go to snack shelf," "Get potato chips," "Go to User," "Deliver potato chips," etc.). In some embodiments, the initial instructions may include a threshold number of examples of syntax and/or grammar from which the LLM can learn and model its responses. In some embodiments, the LLM may generate the intermediate human-readable discrete tasks in parallel or at the same time as the computer-readable program code to cause the cobot to perform an objective.

At block 320, a query may be sent to a cobot or an LLM. For example, a user may ask the cobot a question such as "Can you get me something to eat," or "I'm thirsty." In some embodiments, the query may or may not actually include a target objective to be accomplished. For example, the query "I'm thirsty" does not request the cobot to go and get the user a drink. Rather, the query simply states a problem and the cobot may work with the LLM to deduce the meaning behind the query and determine what is to be done to accomplish the target objective in solving the problem. For example, in response to the query "I'm thirsty," the LLM may determine that a bottle of water is stored on a shelf that is accessible to the cobot and that retrieving the bottle of water and delivering it to the user will satisfy the query. In some embodiments, the query may include a direct command or request, such as "Get me a bottle of water and two AA batteries." In some embodiments, the query may be sent directly to the LLM, such as via a user interface textual chat window.

At block 330, a target set of human-readable discrete tasks may be obtained. For example, the LLM may generate the target set of human-readable discrete tasks that will result in the cobot accomplishing the target objective, for example, the objective that is responsive to the query of the block 320. The LLM and/or the cobot may communicate the set of human-readable discrete tasks to an electronic device of a user and/or to a third-party auditing system.

At block 340, the target set of human-readable discrete tasks may be audited. For example, a human operator may manually review the target set of human-readable discrete tasks to verify that the target set of human-readable discrete tasks includes safe and expected operations. As another example, the target set of human-readable discrete tasks may be provided to a third-party auditing system that may automatically and/or without human input verify the target set of human-readable discrete tasks. Such auditing may be performed based on rules and/or heuristics. In some embodiments, the auditing may include executing the tasks in a virtual environment to validate the safety and/or efficacy of the target set of human-readable discrete tasks.

At block 350, a determination may be made whether the target set of human-readable discrete tasks passed the audit. If the audit was passed, the method 300 may proceed to the block 360. If the audit was not passed, the method 300 may proceed to the block 370.

At block 360, the cobot may be authorized to implement target computer-readable code to perform the target objective. For example, an authorization may be sent from a human operator to the cobot to execute the target computer-readable code to perform the target objective based on the human operator validating the corresponding intermediate set of discrete human-readable tasks. As another example, the third-party auditing system may automatically provide authorization to the cobot based on the audit passing at the block 350.

At block 370, the cobot may be prevented from implementing the target computer-readable code. For example, the LLM may delay sending the target computer-readable code to the cobot until the audit is passed, and based on the audit failing, the LLM may not send the target computer-readable code to the cobot. As another example, the cobot may be programmed to delay executing instructions from the LLM until an authorization is received from the human operator or the third-party auditing system and without that authorization, the cobot may not execute the target computer-readable code.

Modifications, additions, or omissions may be made to the method 300 without departing from the scope of the disclosure. For example, the operations of the method 300 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 4:
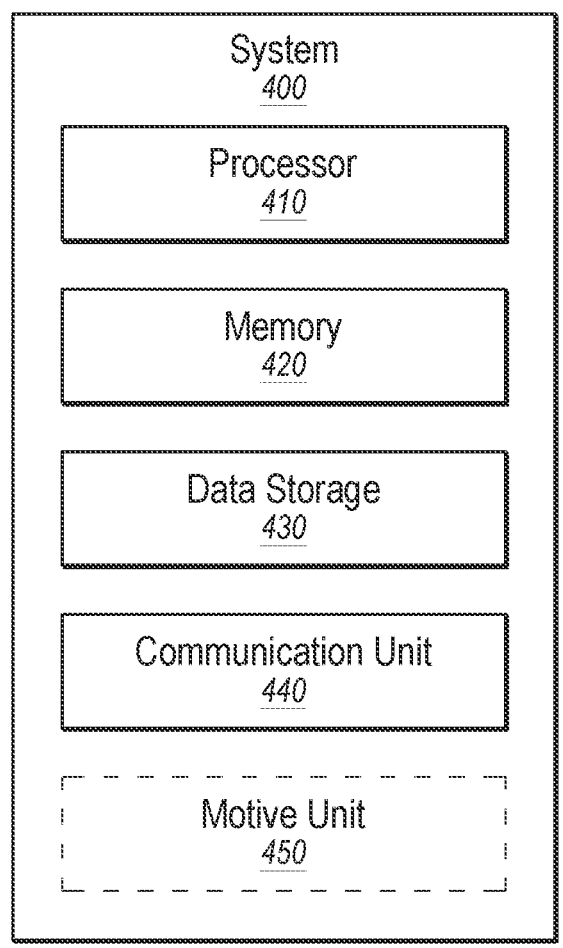
FIG. 4 illustrates an example computing system.

FIG. 4 illustrates an example computing system 400, according to at least one embodiment described in the present disclosure. The computing system 400 may include a processor 410, a memory 420, a storage device 430, a communication unit 440, and/or a motive unit 450, which all may be communicatively coupled. Any or all of the environment 100 of FIG. 1 may be implemented as a computing system consistent with the computing system 400, such as the LLM 120, the cobot 130, and/or the local computing device 110 of FIG. 1.

Generally, the processor 410 may include any computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420. In some embodiments, the processor 410 may load the program instructions into the memory 420.

After the program instructions are loaded into the memory 420, the processor 410 may execute the program instructions, such as instructions to perform any of the method 300 of FIG. 3. For example, the processor 410 may obtain instructions regarding training and/or controlling a cobot The memory 420 and the storage device 430 may include computer-readable storage media or one or more computer-readable storage mediums for carrying or having computer-executable instructions or data structures stored thereon. Such computer-readable storage media may be any available media that may be accessed by a computer, such as the processor 410. In some embodiments, the computing system 400 may or may not include either of the memory 420 and/or the storage device 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 440 may permit data to be exchanged with a network and/or any other devices or systems described in the present disclosure. For example, the communication unit 440 may allow the computing system 400 to communicate with other systems, such as computing devices and/or other networks.

The motive unit 450 may include one or more components, systems, or combinations thereof to facilitate movement of a cobot or other device. For example, the motive unit 450 may include electric motors, hydraulic actuators, pneumatic actuators, mechanical linkages, gears, transmissions, joints, or other mechanical components that may work in combination or on their own to provide movement to a cobot. In some embodiments, the motive unit 450 may operate based on instructions from the processor 410.

One skilled in the art, after reviewing this disclosure, may recognize that modifications, additions, or omissions may be made to the computing system 400 without departing from the scope of the present disclosure. For example, the computing system 400 may include more or fewer components than those explicitly illustrated and described.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    receiving information identifying a set of known locations within an environment, the information comprising coordinates and distances of the known locations from known objects;
    sending a query to a large language model (LLM), the query formed to trigger a cobot to perform a target objective, the LLM constrained to respond to requests to cause the cobot to perform a given objective with a set of human-readable discrete tasks to accomplish the given objective;
    receiving a target set of human-readable discrete tasks from the LLM, the target set of human-readable discrete tasks being based on the set of known locations and corresponding to target computer-readable code that is configured to cause the cobot to perform the target objective;
    auditing the target set of human-readable discrete tasks including:
        executing the target set of human-readable discrete tasks in a virtual environment; and
        observing results of executing the target set of human-readable discrete tasks in the virtual environment to verify that the cobot is performing the target set of human-readable discrete tasks as expected; and
    based on the target set of human-readable discrete tasks passing the audit, authorizing the cobot to implement the target computer-readable code to perform the target objective.

2. The method of claim 1, wherein the auditing is performed by an automated third-party system separate and distinct from each of the LLM and the cobot.

3. The method of claim 2, wherein the automated third-party system operates based on rules, heuristics, or both.

4. The method of claim 1, further comprising providing initial instructions to the LLM constraining the LLM to respond to requests to cause the cobot to perform the given objective with the set of human-readable discrete tasks to accomplish the given objective.

5. The method of claim 1, wherein the query is a natural language query and the LLM is configured to deduce the target objective from the natural language query.

6. The method of claim 5, wherein the natural language query expresses a problem and the target objective addresses the problem without the natural language query identifying the target objective.

7. The method of claim 5, wherein the query is sent audibly by a user to the cobot.

8. The method of claim 5, wherein the query is submitted textually via an electronic device of a user.

9. The method of claim 1, wherein auditing the target set of human-readable discrete tasks includes a human operator reviewing the target set of human-readable discrete tasks.

10. A cobot comprising:
    one or more motors for causing motion of the cobot;
    one or more processors; and
    one or more computer-readable media storing instructions that, when executed by the one or more processors, cause the cobot to perform one or more operations, the operations including:
        receiving a query from a user, the query formed to trigger the cobot to perform a target objective;
        communicating the query to a large language model (LLM), the LLM constrained to respond to requests to cause the cobot to perform a given objective with a set of human-readable discrete tasks to accomplish the given objective;
        receiving a target set of human-readable discrete tasks from the LLM, the target set of human-readable discrete tasks comprising a first portion of human-readable discrete tasks and a second portion of human-readable discrete tasks and the target set of human-readable discrete tasks corresponding to target computer-readable code that is configured to cause the cobot to perform the target objective;
        providing the target set of human-readable discrete tasks to the user;
        delaying execution of the target computer-readable code until receiving authorization from the user;
        receiving authorization from the user that the first portion of human-readable discrete tasks passes an audit by the user; and
        executing a portion of the target computer-readable code that corresponds to the first portion of human-readable discrete tasks to perform a portion of the target objective.

11. The cobot of claim 10, wherein the query is a natural language query, the operations further comprising providing the natural language query to the LLM, the LLM configured to deduce the target objective from the natural language query.

12. The cobot of claim 11, wherein the natural language query expresses a problem and the target objective addresses the problem without the natural language query identifying the target objective.

13. The cobot of claim 11, further comprising a microphone to receive the query audibly from the user.

14. The cobot of claim 10, the operations further comprising:
    traversing a region to identify at least one item in the region with which the cobot is able to interact; and
    communicating the at least one item and a location of the least one item to the LLM.

15. The cobot of claim 10, the operations further comprising:
    traversing a region to identify at least one new location in the region; and
    communicating the at least one new location to the LLM.

16. The cobot of claim 10, wherein the target computer-readable code includes navigation to and interaction with an item not previously identified by the cobot.

17. The cobot of claim 10, wherein the target computer-readable code is received after authorization to execute the target computer-readable code is received.

18. The cobot of claim 10, wherein the target computer-readable code is received with the first target set of human-readable discrete tasks and the second target set of human readable discrete tasks.

19. A cobot comprising:
one or more motors for causing motion of the cobot;
one or more processors; and
one or more computer-readable media storing instructions that, when executed by the one or more processors, cause the cobot to perform one or more operations, the operations including:
traversing a region to capture an image of an item with which the cobot is able to interact;
communicating the image of the item to a large language model (LLM) to identify the item;
receiving a query from a user, the query formed to trigger the cobot to perform a target objective relative to the item;
receiving information identifying a set of known locations within an environment, the information comprising coordinates and distances of the known locations from known objects;
communicating the query to the LLM, the LLM constrained to respond to requests to cause the cobot to perform a given objective with a set of human-readable discrete tasks to accomplish the given objective relative to the item;
receiving a target set of human-readable discrete tasks from the LLM, the target set of human-readable discrete tasks being based on the set of known locations and corresponding to target computer-readable code that is configured to cause the cobot to perform the target objective relative to the item;
providing the target set of human-readable discrete tasks to the user; and
delaying execution of the target computer-readable code until receiving authorization from the user.

* * * * *